(12) United States Patent
Hellbergh

(10) Patent No.: US 7,178,441 B2
(45) Date of Patent: Feb. 20, 2007

(54) VERSATILE BANDSAW BLADE

(75) Inventor: Håkan Hellbergh, Lidköping (SE)

(73) Assignee: Kapman AB, Sandviken (SE)

( * ) Notice: Subject to any disclaimer, the term of this patent is extended or adjusted under 35 U.S.C. 154(b) by 0 days.

(21) Appl. No.: 10/323,841

(22) Filed: Dec. 20, 2002

(65) Prior Publication Data
US 2004/0118263 A1 Jun. 24, 2004

(51) Int. Cl.
*B23D 57/00* (2006.01)
*B27B 33/02* (2006.01)

(52) U.S. Cl. .............. 83/835; 83/846; 83/848; 76/112

(58) Field of Classification Search .......... 83/846, 83/847, 848, 835, 661, 854, 855; 76/112, 76/58
See application file for complete search history.

(56) References Cited

U.S. PATENT DOCUMENTS

| | | | | |
|---|---|---|---|---|
| 3,072,164 A | * | 1/1963 | Ramirez et al. ............. 83/661 |
| 4,292,871 A | * | 10/1981 | Neumeyer et al. ............ 83/661 |
| 5,249,485 A | * | 10/1993 | Hayden, Sr. .................. 76/112 |
| 5,477,763 A | * | 12/1995 | Kullman ....................... 83/846 |
| 5,697,280 A | * | 12/1997 | Armstrong et al. ........... 83/848 |
| 6,003,422 A | * | 12/1999 | Holston ....................... 83/661 |
| 6,158,324 A | * | 12/2000 | Kullmann et al. ............ 83/848 |
| 6,167,792 B1 | * | 1/2001 | Korb et al. ................... 83/835 |
| 6,276,248 B1 | * | 8/2001 | Cranna ......................... 83/848 |
| 6,520,722 B2 | * | 2/2003 | Hopper et al. ................ 407/42 |
| 6,601,495 B2 | * | 8/2003 | Cranna ......................... 83/848 |

* cited by examiner

*Primary Examiner*—Boyer D. Ashley
*Assistant Examiner*—Omar Flores Sánchez
(74) *Attorney, Agent, or Firm*—Buchanan Ingersoll & Rooney PC

(57) ABSTRACT

A bandsaw blade includes a blade beam carrying a plurality of cutting teeth separated by gullets. A clearance angle of the teeth is smaller than 35°, and the back of a leading tooth has a convex transition to a gullet. The radius of the gullet is larger than ½ of the depth of the gullet.

9 Claims, 1 Drawing Sheet

VERSATILE BANDSAW BLADE

FIELD OF INVENTION

The present invention relates to a versatile bandsaw blade comprising a blade beam carrying a plurality of cutting teeth.

BACKGROUND OF THE INVENTION

Bandsawing is the preferred method for cutting long pieces of metal into predetermined lengths as a preparation for other operations such as welding, turning and milling.

When using bandsaw blades in maintenance and other smaller workshops it is common to cut a wide variety of work piece materials and sizes. It is not unusual that the operator of the saw machine is inexperienced and not properly trained in the use of the machine. Blades are seldom changed when cutting a new work piece, which is why the choice of bandsaw blade type and tooth pitch is not always done in the optimal way. The upkeep of the machine is often neglected, which is why cuts are frequently made without properly using the chip brush.

The consequence of these circumstances is that the saw blades are frequently prematurely destroyed. They are destroyed because the teeth are broken. The teeth break either because too coarse of a tooth pitch is used when cutting small work pieces such as thin walled tubes or profiles, or because too fine of a pitch is used when cutting large work pieces or when too high of a feed rate or too low of a band speed is used. When too coarse of a pitch is used, the teeth break because the teeth are overloaded. When too fine of a pitch is used, or when too high of a feed rate or too low of a band speed is used, or the chip brush is not properly used, the gullets are completely filled and excessive pressure is built up in the gullet, leading to tooth breakage.

Bandsaw blades for the above-described applications are normally designed with identical, repeating groups of teeth, wherein each group exhibits a variable pitch. This means that the distance between the teeth of each group varies in a predetermined way, each group repeating the same variation in tooth distance, so that harmonic vibrations are reduced when sawing. The ratio between the biggest tooth distance in the group and the smallest tooth distance is typically >1.4. Such a blade consists of groups of teeth, each group typically being of a length of 1.5". The number of teeth in each group varies with the pitch of the blade but is typically odd in number. A blade with a 6/10 teeth per inch pitch typically has 11 teeth in each group. The meaning of the designation "6/10" is that the biggest tooth gullet in the group has a size corresponding to a regular 6 TPI blade, and the smallest gullet has a size corresponding to a 10 TPI blade. The clearance angle of the teeth is typically 35°, and the clearance side of the tooth, or the back of the tooth, is straight, leading to a small bottom radius of the gullet. The size of the bottom radius of the gullet is typically less than one-half of the depth of the gullet.

In deep gullets with small radii, the risk of swarf becoming locked in the gullet is increased. The swarf is often in the form of spiral shaped chips that get trapped between the sides of the deep, narrow gullets. The radius of such chips is typically about one-half of the depth of the gullets i.e., bigger than the radius of the gullets, thereby causing the chips to be locked in the bottom of the gullets.

Typically, most of the teeth are set, i.e., bent to the right or left. It is known to set the teeth within a group according to a predetermined setting pattern. The setting pattern of such a group normally follows the order: -0-R-L-R-L-R-L-R-L-R-L- wherein the first tooth in the group is unset (0), the next is set to the right (R), the following to the left (L), etc., there being only one unset tooth per group. The setting operation is done one group at a time. When setting-up the tooth-setting machine, it is of great importance that the correct tooth is left unset. If the wrong tooth is left unset, the setting hammers will hit the other teeth in the group in such a way that the teeth or the edges are deformed in an unwanted way. This leads to high amount of scrapped material in the production of such bandsaw blades.

The design of the gullets of traditional blades of this kind is such that all gullets in the group are proportional i.e. they have the same relationship between tooth distance, gullet depth and gullet radius. The chip holding capacity of each gullet in the group is proportional to the cross sectional area of the gullet. The chip holding capacity of the gullets in such a design is limited by the cross sectional area of the smallest gullet in the group. The other, bigger gullets in the group are unnecessarily big because all their dimensions are proportional to the tooth distance in relation to the smallest gullet.

A gullet that has a tooth distance that is 20% greater than the smallest gullet in the group will need 20% more chip capacity than the smallest gullet. By making all dimensions of the gullet proportional to the smallest gullet, the chip holding capacity will be 1.2×1.2=1.44, i.e., 44% more than the smallest gullet. This will result in gullet depths that are deeper than necessary, leading to reduced beam strength of the blade. Reduced beam strength will lead to out-of-square cutting at lower sawing loads compared to a blade with higher beam strength.

TECHNICAL PROBLEMS

Taking the background of the invention into consideration, it is a technical goal to produce strong bandsaw blades, both in the sense of having teeth that are not easily broken and in the sense of the beam strength of the blade.

It is a technical goal to reduce the risk of the teeth breaking, either because they are overloaded or because the gullets are filled with swarf.

It is a technical goal to set the teeth without unwanted scrap caused by mispitching.

It is also a technical goal to maintain beam strength and still have gullets with sufficient chip capacity.

SOLUTION

The present invention teaches a new tooth design that overcomes all of the problems described above. The bandsaw blade comprises a blade beam formed with a plurality of cutting teeth, wherein successive teeth are separated by a gullet bordered by: a back of a leading one of the successive teeth, a front of a trailing one of the successive teeth, and a radiused bottom. The back joins the radiused bottom by a generally convex transition portion. A clearance angle between the successive teeth is less than 35°. The radiused bottom has a radius larger than one-half of a depth of the respective gullet.

ADVANTAGES

The advantages of a bandsaw blade according to the present invention are that both the tooth strength and the strength of the beam are sufficiently high, that the gullets will be dimensioned to the required chip capacity and that unwanted scrap due to mispitching while setting the teeth is reduced.

BRIEF DESCRIPTION OF THE DRAWINGS

So that the invention will be more readily understood and further features thereof made apparent, the invention will now be described in more detail with reference to exemplifying embodiments thereof and also with reference to the accompanying drawings, in which.

DESCRIPTION OF PREFERRED EMBODIMENTS

Figure 1:
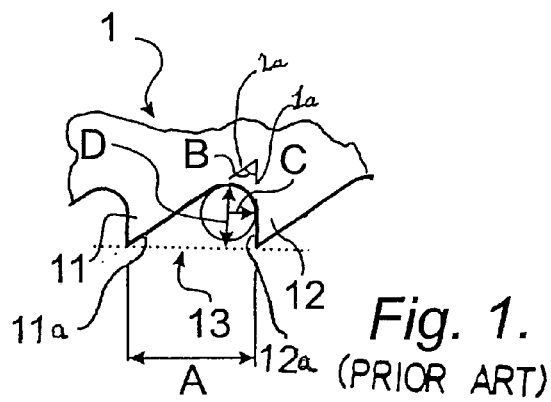
FIG. 1 schematically shows a known bandsaw blade.

FIG. 1 shows a conventional bandsaw blade 1 with leading and trailing teeth 11,12 separated by a gullet 13. Parameters pertinent to the present invention are the tooth distance A, the clearance angle B, the radius C of the gullet 13, and the depth D of the gullet 13. The expression "leading tooth" as used herein refers to any tooth which leads another, trailing tooth. A bottom of each gullet is radiused with a radius C. A clearance angle B is defined between successive teeth, each clearance angle B formed between a first line 1 which is tangent to the radiused bottom at a point where the radiused bottom joins the front 12c of the trailing tooth 12, and a second line 2 which is tangent to the radiused bottom of the gullet at a point where the radiused bottom joins to the back 11a of the leading tooth 11.

Figure 2:
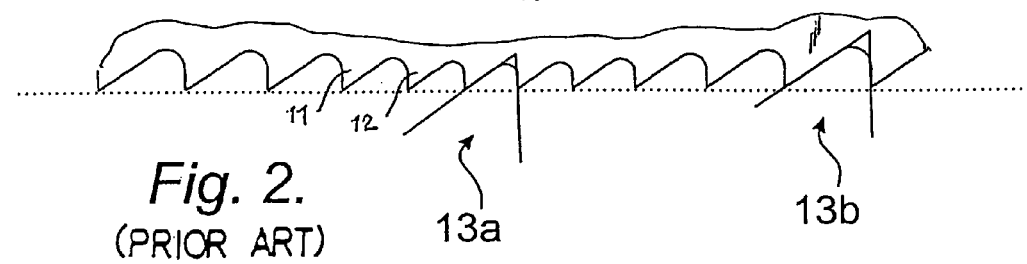
FIG. 2 schematically shows a known bandsaw blade with teeth divided into groups.

FIG. 2 shows a known bandsaw blade where the teeth are divided into groups, each group repeating the same variation in tooth distance. The figure shows that the smallest gullet 13a and the largest gullet 13b differ in all of the above-mentioned parameters A—D.

It is apparent from the figure that the smallest gullet is not able to handle as much swarf as the largest gullet. The largest gullet is on the other hand, deeper than the smallest gullet, thereby reducing the beam strength.

Figure 3:
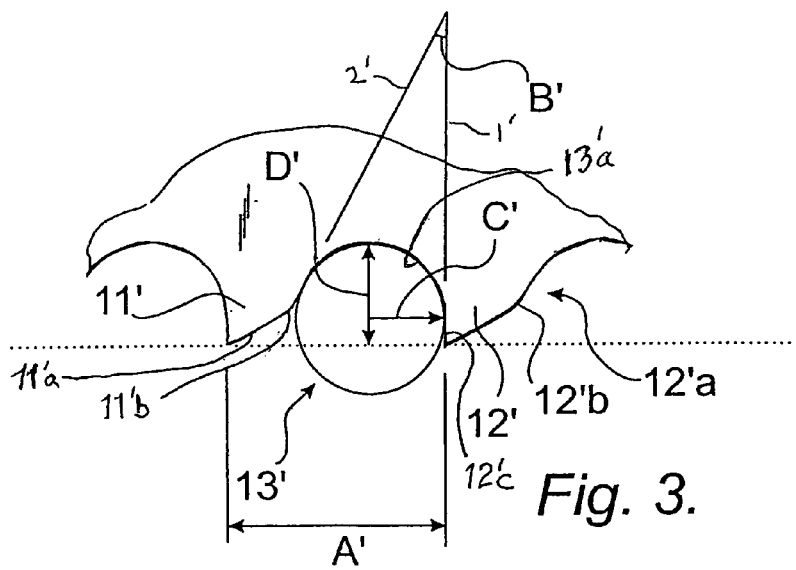
FIG. 3 schematically shows teeth of a bandsaw blade according to the present invention.

FIG. 3 shows a versatile bandsaw blade according to the present invention which presents a tooth designed to have a tooth edge stronger than in previous designs. This is achieved by using a clearance angle B' of the teeth 11', 12' that is smaller than 35°, for example, 30°, and a strong base of the tooth. The back 11'a of the leading tooth 11' joins with the radiused bottom 13'a of the gullet 13' by a generally convex transition portion 11'b. A line 2' which is tangent to the radiused bottom of the gullet 13' at the point where the transition portion 11'b joins the radiused bottom, forms the clearance angle B' with a line 1' that is tangent to the radiused bottom at the point where the radiused bottom joins the front portion 12'c of the trailing tooth 12'.

The back of each tooth has such a convex transition with the radiused bottom of the respective gullet. The radius C' of the gullet 13' is relatively large, i.e., it is larger than one-half of the depth of the gullet 13'. The radius C' can for instance be approximately ¾ of the depth D' of the gullet 13'.

This design has proven to give higher resistance to tooth breakage compared to the known design, both against the overload caused by too coarse of a pitch and overload caused by the gullets being filled by swarf. The radii of the chips, typically being one-half of the depth D of the gullets, will be substantially smaller than the radius C' of the bottom of the gullets thereby being easily ejected from the gullets even without the use of a chip brush.

Figure 4:
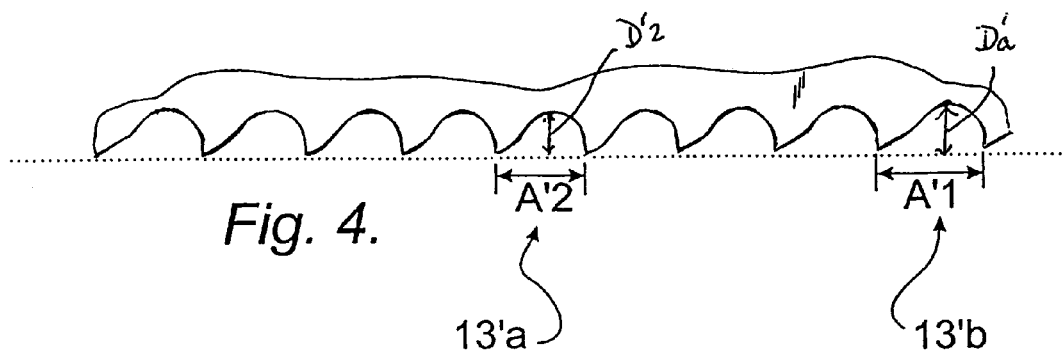
FIG. 4 schematically shows an inventive bandsaw blade with a variable tooth distance.

FIG. 4 shows the variable tooth distance of the blade according to the present invention. This is made with a ratio between the biggest tooth distance Al in the group and the smallest tooth distance A'2 that is substantially smaller than the 1.4 ratio used before (i.e., the ratio of A'1 to A'2 is about 1.3). The result of this is that the gullet capacity of the smallest gullet 13'a in the group is substantially bigger than the smallest gullet 13a in the previously known design (see FIG. 2). This will further reduce the risk of teeth being broken because of filled gullets.

The setting pattern in each group of the new blade is -0-R-L-0-R-L-. The combination of the small difference between the biggest and the smallest gullets and the set pattern will allow the blade to be set in different ways. It does not matter which tooth is left unset, set to the right, or set to the left. When producing such a blade it therefore does not require the difficult set up procedure required by the known design, and the risk of destroyed teeth and high scrap numbers is eliminated. The number of teeth in each combo group can be any number greater than four.

The design of the gullets of the blade according to the present invention is such that a ratio of the depth D'1 of any (given) gullet in a group of teeth to the depth D'2 of the smallest gullet in that group, is equal to the square root of a ratio of the tooth distance A'1 of such given gullet to the tooth distance A'2 of that smallest tooth, i.e., $$\frac{D'1}{D'2} = \sqrt{\frac{A'1}{A'2}}$$

For example, if a gullet 13'b has a tooth distance A'1 that is 20% larger than the tooth distance A'2 of the smallest gullet 13'a (i.e., if A'1/A'2=1.2), then the depth D'1 of the gullet 13'b would be 9.5% larger than the depth D'2 of the smallest gullet 13'a, since:

$$\frac{D'1}{D'2} = \sqrt{1.2} = 1.095$$

Thus, a gullet that has a tooth distance that is 20% greater than the tooth distance of the smallest gullet in the group will need 20% more chip capacity than the smallest gullet. By making all dimensions of the gullet proportional to the square root of the ratio of the tooth distance of the gullet in question and the tooth distance of the smallest gullet in the group, the chip holding capacity will be $\sqrt{(1.2) \times (1.2)}=1.2$ i.e., 20% more than the smallest gullet. This will result in gullet depths that are not deeper than necessary, leading to increased beam strength of the blade compared to normal blades wherein the chip holding capacity is 44% more than the smallest gullet (i.e., 1.2×1.2–1.44) as explained earlier.

The above-described relationship of the gullet distance is also applicable to the gullet radius C, i.e.:

$$\frac{C'1}{C'2} = \sqrt{\frac{A'1}{A'2}}$$

wherein C'1 is the radius of any (given) gullet in a group; C'2 is the radius of the smallest gullet in that group; and A'1, A'2 are the same as described above.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A bandsaw blade comprising:

a blade beam formed with a plurality of cutting teeth, wherein successive teeth are separated by a gullet bordered by: a back of a leading one of the successive teeth, a front of a trailing one of the successive teeth, and a radiused bottom; the back joining the radiused bottom by a generally convex transition portion; wherein the teeth form at least two identical groups; each group including two successive teeth defining a shortest distance therebetween; wherein the following relationships are valid concerning the teeth of each group:

$$\frac{D'1}{D'2} = \frac{C'1}{C'2} = \sqrt{\frac{A'1}{A'2}}$$

wherein $D'1$ is a depth of a given gullet, $D'2$ is a depth of the smallest gullet, $C'1$ is a radius of the bottom of the given gullet, $C'2$ is the radius of the bottom of the smallest gullet, $A'1$ is a distance between successive teeth separated by the given gullet, and $A'2$ is a smallest distance between successive teeth.

2. The bandsaw blade according to claim 1 wherein a clearance angle between the successive teeth being less than 35 degrees, and the radiused bottom having a radius larger than one-half of a depth of the respective gullet.

3. The bandsaw blade according to claim 2 wherein the radius of each radiused bottom is about ¾ of the depth of the respective gullet.

4. The bandsaw blade according to claim 2 wherein the clearance angle comprises 30 degrees.

5. The bandsaw blade according to claim 4 wherein the radius of each radiused bottom is about ¾ of the depth of the respective gullet.

6. The bandsaw blade according to claim 1 wherein a ratio of the longest distance to the shortest distance being less than 1.4, where each group comprises more than four teeth, where the teeth of each group include straight (unset) teeth and set teeth, the setting pattern being 0-R-L-0-R-L-, where 0 means unset, R means set to the right, and L means set to the left, and where the setting pattern is independent of where the pattern starts in the group, so that it does not matter which tooth in the group is left unset, set to the right, or set to the left.

7. The bandsaw blade according to claim 6 wherein the ratio is 1.3.

8. The bandsaw blade according to claim 7 wherein a clearance angle between the successive teeth being less than 35 degrees, and the radiused bottom having a radius larger than one-half of a depth of the respective gullet.

9. The bandsaw blade according to claim 6 wherein a clearance angle between the successive teeth being less than 35 degrees, and the radiused bottom having a radius larger than one-half of a depth of the respective gullet.

* * * * *